US 6,607,909 B1

(12) United States Patent
Yagihashi et al.

(10) Patent No.: US 6,607,909 B1
(45) Date of Patent: Aug. 19, 2003

(54) APPARATUS FOR PRODUCING COMPOST

(75) Inventors: Shinji Yagihashi, Yaizu (JP); Toshio Kurihara, Yaizu (JP); Shinji Yamashita, Yaizu (JP); Fujio Kobayashi, Yaizu (JP); Yasukazu Nakakita, Yaizu (JP)

(73) Assignee: Sapporo Breweries Limited, Tokyo (JP)

( * ) Notice: Subject to any disclaimer, the term of this patent is extended or adjusted under 35 U.S.C. 154(b) by 113 days.

(21) Appl. No.: 09/716,948

(22) Filed: Nov. 22, 2000

Related U.S. Application Data

(63) Continuation of application No. 09/147,610, filed as application No. PCT/JP98/02376 on May 29, 1998, now Pat. No. 6,217,628.

(30) Foreign Application Priority Data

May 30, 1997 (JP) .............................................. 9-156090
Jul. 10, 1997 (JP) .............................................. 9-199179

(51) Int. Cl.$^7$ .............................................. C12M 1/02
(52) U.S. Cl. .................................................. 435/290.2
(58) Field of Search .................. 71/9, 23, 26; 435/290.2

(56) References Cited

U.S. PATENT DOCUMENTS 5,661,031 A * 8/1997 Murphy et al. .......... 435/290.3
6,217,628 B1 * 4/2001 Yagihashi et al. ................ 71/9

FOREIGN PATENT DOCUMENTS

| JP | 301791 | * 11/1993 |
| JP | 325088 | * 12/1996 |
| JP | 57235 | * 3/1997 |

* cited by examiner

Primary Examiner—Wayne A. Langel
(74) Attorney, Agent, or Firm—Oblon, Spivak, McClelland, Maier & Neustadt, P.C.

(57) ABSTRACT

The present invention relates to a process for producing compost, characterized in that when the compost is produced by inoculating aerobic composting seed bacteria to an organic waste material, the process comprises: supplying oxygen while the waste material is stirred, and supplying water so that the water content of the waste material is 60±5%, and to a process for producing compost, characterized in that when the compost is produced by inoculating aerobic composting seed bacteria to an organic waste material, the process comprises, after begining of the fermentation, adding sugars to the waste material in a divisional manner before a main fermentation is transferred to the amine/ammonium metabolic system. Further, according to the present invention, an apparatus for producing compost is provided. The apparatus comprises: a fermentation vessel having an oxygen supplying means, a water distributing means, and a stirring means; and a control means for detecting or determining the moisture content of an organic waste material contained in the fermentation vessel to control, on the basis of the detected or determined result, the amount of water to be distributed by the water distributing means.

According to the present invention, when organic waste materials disposed from food processing factories and the like is processed to produce compost of high quality, formation of ammonium and amines mainly causing unpleasant odors or generation of lower fatty acid which is a factor for a growth inhibition of plants can be suppressed, and the compost can be produced in stable, and within a short period of time.

5 Claims, 6 Drawing Sheets

APPARATUS FOR PRODUCING COMPOST

This application is a continuation of application Ser. No. 09/147,610 filed on Feb. 1, 1999, now U.S. Pat. No. 6,217,628, which was originally filed as 371 International Application No. PCT/JP98/02376, filed May 29, 1998.

TECHNICAL FIELD

The present invention relates to a process for producing compost and an apparatus therefor. More specifically, the present invention is directed to a process for producing compost with high quality having less unpleasantly odors within a short period of time by processing organic waste materials disposed from food processing factories and the like, and to an apparatus for producing the same.

TECHNICAL BACKGROUND

Conventionally, composting has been conducted to realize effective utilization of waste materials in food industry, food processing industry, livestock industry, and the like where organic waste materials are most likely to be produced. In such municipalities that deal with urban garbage, composting has also been conducted for the purpose of volume reduction or conversion to stable substances. In particular, many organic waste materials disposed from food processing factories and the like are likely to have high water content at the time of being disposed from these factories. Therefore, if it is left alone during summer, a variety of bacteria may grow, putrefaction may begin, and unpleasant odors that mainly come from putrefaction odors may occur. Then, there arises a problem in view of the environmental protection.

Further, since the waste materials have in general high moisture content when composted, the anaerobic environment may be partially generated within a fermentation vessel. Then, the fermentation operation may be conducted under the mixture condition of anaerobic bacteria and aerobic bacteria, so that the fermentation efficiency is low. Typically, several months are required until protein, fat, or the like are decomposed and stabilized as compost.

Still further, since the fermentation efficiency is low as described above, unpleasant odors caused by amines, ammonium, or the like as major component are always carried while compost is produced. In addition, the sufficient fermentation operation may not be possibly conducted, the obtained product may be fermented again when it is used as compost, and then unpleasant odors may possibly occur. Furthermore, it cannot be avoided to accumulate, during composting, lower fatty acid serving as a factor for the growth inhibition of plants.

As means for suppressing the above, some processes using various microorganisms have been attempted. In fact, however, any satisfactory effects have not been obtained.

Moreover, the thus obtained compost may be of fine powders like soil, in which decomposed fibers may remain large, so that inconvenience in handling may be arisen for packing, transportation, storage, dispersion, and the like. In particular, such fine powder can be easily scurried when it is dispersed, and thus such compost must be dispersed selectively on unwindy days.

A first object of the present invention is to overcome the above-described conventional problems, and to establish a process for producing compost in a stable manner and in a short period of time by conducting the steps of fermentation and composting for organic waste materials under the aerobic condition, reducing the occurrence period of ammonium and amines causing unpleasant odors, preventing the reoccurrence of such unpleasant odors, and inhibiting occurrence and accumulation of lower fatty acid (e.g., isobutyric acid, butyric acid, isovaleric acid, and acetic acid) which are inhibitor of the growth of plants.

Also, in order to improve workability for dispersing the compost, the one having a predetermined size and weight will be necessary.

According to the study of the inventors of the present invention, it has been discovered that for the purpose of realizing and sustaining the aerobic fermentation state effective for composting, the oxygen concentration in an organic waste material (hereinafter, sometimes referred to as material) must be constantly kept at a predetermined value or more, and an appropriate water content in the material must be kept. The present inventors have made intensive investigation and have then discovered that uniform and excellent fermentation with the aerobic bacteria can be achieved by stirring the whole material in a fermentation tank to uniformly sustain the fermentation, supplying oxygen over the entire material, and supplying water to keep the water content of the material at 60±5%.

Further, when the aerobic fermentation is conducted using spent grains as material, during its primary fermentation period, small amount of saccharide (or sugar) contained in the spent grains is initially decomposed, sugars obtained by decomposing hemicellulose or cellulose are then used as an energy source for the growth of microorganisms. On the other hand, the present inventors assume that, when cellulose or the like is slowly decomposed, the aerobic bacteria obtain energy for the growth through the metabolic pathway in which it is decomposed from protein to amines/ammonium through amino acid (hereinafter, referred to as "amine/ammonium metabolic system"), whereby unpleasant odors may be generated. Therefore, it is conceivable that the metabolic system from protein to amino acid is replaced with the metabolic growth system using sugar as an energy source, so that occurrence of such unpleasant odors at the fermentation may be prevented.

This assumption is supported by existence of the report that when sugars such as molasses are added at a time at the beginning of fermentation to compost organic waste materials, such unpleasant odors can be more prevented from occurring in comparison with the case where no sugar is added. According to the study of the inventors of the present invention, however, the fermentation is allowed to slowly proceed under this method of adding at a time (batch addition method), so that not only sugar metabolism but also the fermentation in the protein-amino acid decomposition metabolic system may be possibly activated, and occurrence of such unpleasant odors may not be sufficiently prevented.

Accordingly, in order to solve the above described problems, a second object of the present invention is to control the fermentation so that the subject of the aerobic fermentation may be always fermented through the sugar decomposition metabolism, and therefore to provide a process for adding sugars in a divisional manner at a predetermined timing so that the aerobic fermentation may not transfer to the fermentation based on the protein-amino acid decomposition metabolism, so that the fermentation based on the metabolic growth system using saccharides as an energy source can be conducted, for greatly inhibiting occurrence of the amines and ammonium causing such unpleasant odors at the fermentation, and for producing compost with high quality.

DISCLOSURE OF THE INVENTION

Therefore, the present invention relates to a process for producing compost, characterized in that when the compost is produced by inoculating aerobic composting seed bacteria to an organic waste material, the process comprises: supplying oxygen while the waste material is stirred; and supplying water so that the water content of the waste material is 60±5%.

The present invention also relates to a process for producing compost, characterized in that when the compost is produced by inoculating aerobic composting seed bacteria to an organic waste material, the process comprises adding sugars to the waste material in a divisional manner so that the subject of the fermentation is always conducted through the sugar decomposition metabolism, that is, before the subject of fermentation is transferred to the amine/ammonium metabolic system, during an active fermentation period.

Further, the present invention is directed to an apparatus for producing compost, comprising: a fermentation tank having an oxygen supply means, a water distributing means, and a stirring means; and means for detecting the water content of an organic waste material contained in the fermentation vessel and for controlling, on the basis of the detected result, the amount of water sprayed (or distributed) by the water distributing means.

BEST MODE FOR CARRYING OUT THE INVENTION

In the present invention, an organic waste material means disposal from food manufacturing factories, food processing facilities, and the like, including spent grains disposed from beer factories, fish cake disposed from fishery processing factories, and other grain lees such as soybean pulp disposed in the course of bean curd production. These waste materials contain carbohydrate, protein, fat, and the like, and the water content typically ranges from 55 to 70% (it is noted that these are moisture-controlled for the purpose of easy transportation or reuse). When the water content of the organic waste material as material is beyond this range, the water content must be adjusted so that the aerobic fermentation can be effectively conducted.

Although any saccharides may be added upon the fermentation of the organic waste material if it can be used for the compost production by initiated bacteria (seed bacteria), molasses or blackstrap molasses is preferable. In particular, the blackstrap molasses are more preferable which are extraction lees obtained when saccharides is fined and contain molasses.

As seed bacteria for the compost production, off-the-shelf compost or commercially available microorganisms can be used.

Figure 1:
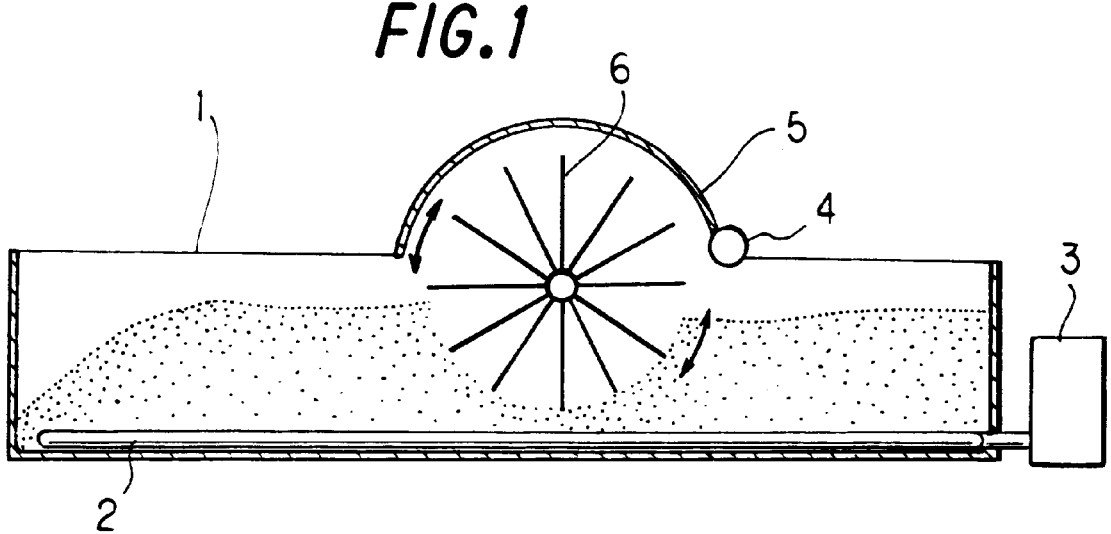
FIG. 1 is a side sectional explanatory diagram showing one embodiment of an apparatus of the present invention.
Figure 2:
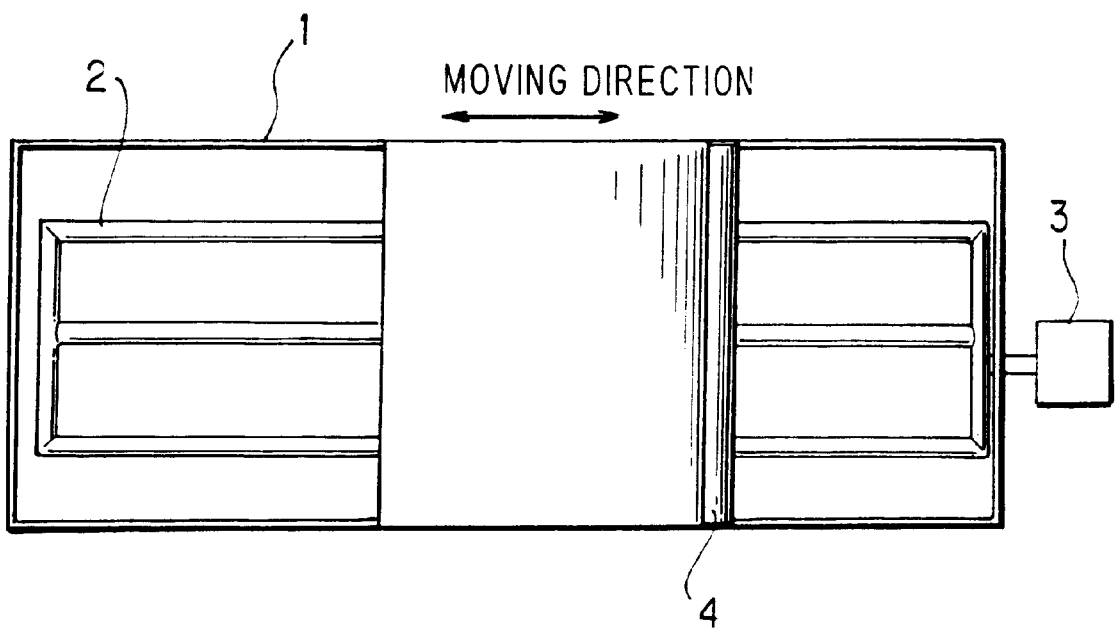
FIG. 2 is a plan explanatory diagram showing one embodiment of the apparatus of the present invention.

A fermentation apparatus as shown in FIGS. 1 and 2 may be used as an apparatus for producing compost according to the present invention. The main portion of the apparatus is a fermentation vessel, and an open fermentation vessel is typically used therefor. The fermentation vessel includes an oxygen supply means for constantly keeping the oxygen concentration around the material during fermentation at a predetermined concentration or more, and a water distributing means for keeping the water content in the fermented product of the material during fermentation under the most appropriate state. It further includes a stirring means for regularly stirring the whole material during fermentation to realize uniformity of the aerobic bacteria growth within the vessel.

As the temperature rises in the course of compost production, an evaporation of water from the material cannot be avoided, and if it is left as it is, the aerobic fermentation may not be smoothly conducted. Therefore, as previously described, water is appropriately supplied by the water distributing means. For this purpose, the water content of the material during fermentation must be found. Accordingly, the apparatus of the present invention may include means for detecting the water content of the material within the fermentation vessel and means for controlling the amount of water sprayed by the water distributing means on the basis of the detected result. Alternatively, it may include an apparatus for controlling the water distributing means which preliminarily determines the timing of water supply and the supply amount based on the data of the water content of the material relative to the temperature and that of the water content of the material relative to the fermentation duration, both of which measured at a test operation of the fermentation apparatus to be provided as apparatus control data, such that the water content in the material may be adjusted by monitoring and measuring the temperature of the material during fermentation, or the fermentation duration, and providing the measured data to the control apparatus to control the water distributing means.

FIG. 1 is a side sectional explanatory diagram showing the compost production apparatus, and FIG. 2 is a plan explanatory diagram showing said apparatus. In the figures, reference numeral 1 denotes an open fermentation vessel, 2; an aeration pipe, 3; an air blower, 4; a water distribution pipe, 5; a stirrer, and 6; a stirring blade. It is noted that although not shown in the drawings, the apparatus of the present invention also includes a distribution unit for supplying water to the material during fermentation through the water distribution pipe 4, a detection means for detecting the water content in the material, and a control means for controlling the distribution unit on the basis of detection data from the above detection means.

Further, as a process for controlling the distribution unit, other than the above description, there is also a process for preliminarily memorizing the apparatus control data indicative of the timing and the supply amount of supplying water on the basis of the above-described material temperature or the fermentation duration, for measuring the material temperature or the fermentation duration, and for controlling the distribution unit through the control means based on the above-described memory.

The present invention will now be described with reference to the figures. First, the material is charged into a fermentation vessel, and the seed bacteria are then inoculated, so that the fermentation operation is initiated. The material is entirely stirred by the rotation of the stirring blade 6 in the stirrer 5 moving reciprocally in a longitudinal direction of the fermentation vessel 1. The whole material is stirred so that the aerobic microorganism can grow predominantly and is extended thereover. Preferably, stirring is conducted twice or more a day in the fermentation period. This enables uniformity of the growth of the aerobic microorganism to be realized Oxygen is introduced from the air blower 3 so that oxygen (typically, air) can be supplied over the entire material, and then directed through the aeration pipe 2 to the material. As a result, oxygen is introduced into the fermentation vessel, so that the oxygen concentration in the material layer within the fermentation vessel can be kept at 15% or more, preferably 17 to 21%. Therefore, the entire material can be fermented under the aerobic condition.

Further, the water content of the material is measured by a detection means to adjust the water content of the material during fermentation. The measurement results are transmitted to the control means, where the amount of water distributed to the material is determined to control the amount of water distributed from the water distribution pipe 4 for adjustment. In this manner, the water content of the material during fermentation can be kept at 60±5% As a result, satisfactry fermentation by the aerobic microorganism can be maintained Generally, it takes about 3 to 4 weeks to produce compost.

Since the material during fermentation gradually becomes viscous, if it is left as it is, it could be combined with each other, and oxygen could not be uniformly supplied over the entire material, possibly resulting in difficulty in continuing the aerobic fermentation. Therefore, according to the present invention, the material is stirred to break the solidified product, and therefore oxygen can be supplied over the entire material.

In the compost production with the aerobic fermentation, since the thermophilic fermentation is continued, water may be drastically vaporized by fermentation heat, possibly resulting in difficulty in maintaining good fermentation-state. For this reason, the water content in the material during fermentation is periodically examined to determine the amount of water to be distributed based on the detected information, supply water short, and thereby keep the water content at 60±5% which is the most appropriate.

When sugars are added, the addition time is determined using the fermentation temperature just after the initiation of fermentation as index of the fermentation state. The activation of fermentation accompanies heat. The fermentation temperature drastically rises, the high temperature state maintains for about 1 to 2 weeks, and the primary fermentation is then completed. Thereafter, for about 2 weeks, the secondary fermentation with actinomycetes or molds (filamentous fungi) is performed at the fermentation temperature of almost 20 to 30° C., and composting terminates throughout the fermentation process for about 30 days.

In the primary fermentation, it is conceivable that microorganisms during fermentation repeat in the order of growth, increment of microorganism, activation, and growth in a cycle. In the batch addition, the number of fungi increases using sugars as growth energy, and when sugars are consumed, protein or hemicellulose is decomposed to generate energy. Therefore, more amine/ammonium is generated in the metabolic process. In the divisional addition, however, growth is conducted using sugars as growth energy, and the fungus body captures protein contained in the fermented product as a microbial body protein. When sugars are consumed, the growth is temporarily stopped, thereby to fall the fermentation temperature. If sugars are added again at this stage, it is considered that the growth is activated to inhibit yield of amine/ammonium. This type of fermentation continues until protein contained in the fermented product is consumed.

When no elevation of the temperature is observed even if sugars are added, which is occurred at a period of about 2 weeks, it means that the primary fermentation is completed, and then the addition of sugars is stopped at this stage.

Accordingly, as the fermentation operation continues, the compost becomes gradually viscous, forming a solidified product by combining with each other. When stirring further continues, the compost having a certain dimension and weight, and thus the compost being excellent in processing can be obtained.

A case where spent grains are used as the material will now be described. Most of the obtained compost is in the form of flake, having grain size of about 5 to 10 mm. Therefore, when the compost is dispersed, there is no fear that it scurries due to wind or the like. Incidentally, the cause to increase viscosity of the compost is believed that hemicellulose or cellulose formed on the surface is decomposed in the fermentation process to generate sugars.

The present invention will now be described with reference to examples, etc., but the present invention is not limited thereto.

EXAMPLE 1

About 15 $m^3$ of spent grains (moisture content of about 67%) yielded in a beer factory were stored in a fermentation vessel for producing compost. 20 g of this spent grains were suspended to 100 ml of distilated water, while pH of 5.4 was obtained. The spent grains were delivered by about 1 $m^3$ to a batch fermentation vessel having the width of 2 meters, the height of 1.2 meters, and the depth of 13 meters by a bucket loader. Two percent (v/v) of spent grains compost are added thereto as seed bacteria, these are mixed, and then the mixture is more sufficiently stirred by a stirrer, completing preparation for composting.

As for a fermentation management condition after the completion of preparation, aeration pipes each having 2 mm in diameter of apertures spaced by 10 cm were placed on a floor of the fermentation vessel in parallel at intervals of 60 cm. These pipes were held by continuous aeration by a forcible air blower, and the oxygen concentration within the fermentation vessel at this stage was 15% or more. Water (60±5%) was kept by stirring (twice a day) by the above-noted stirrer using a water distribution pipe and by distributing water at the same time.

Figure 3:
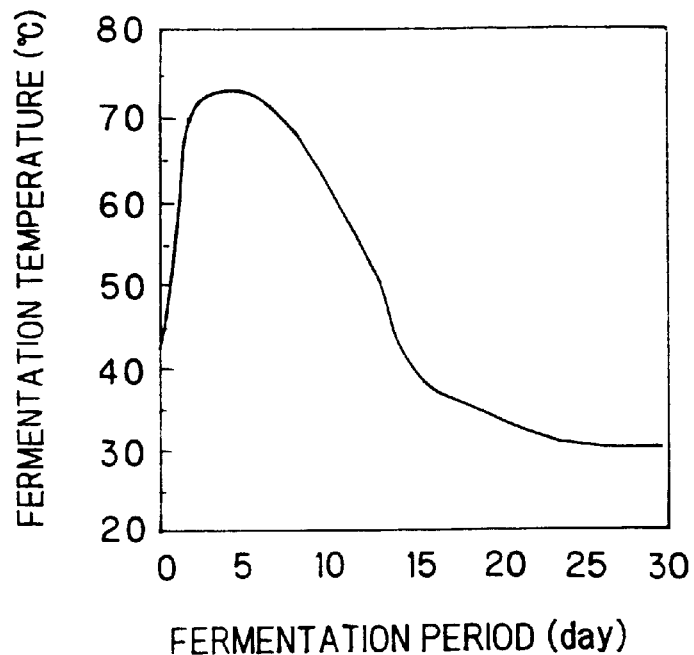
FIG. 3 illustrates the temperature change at the fermentation in case of composting spent grains.
Figure 4:
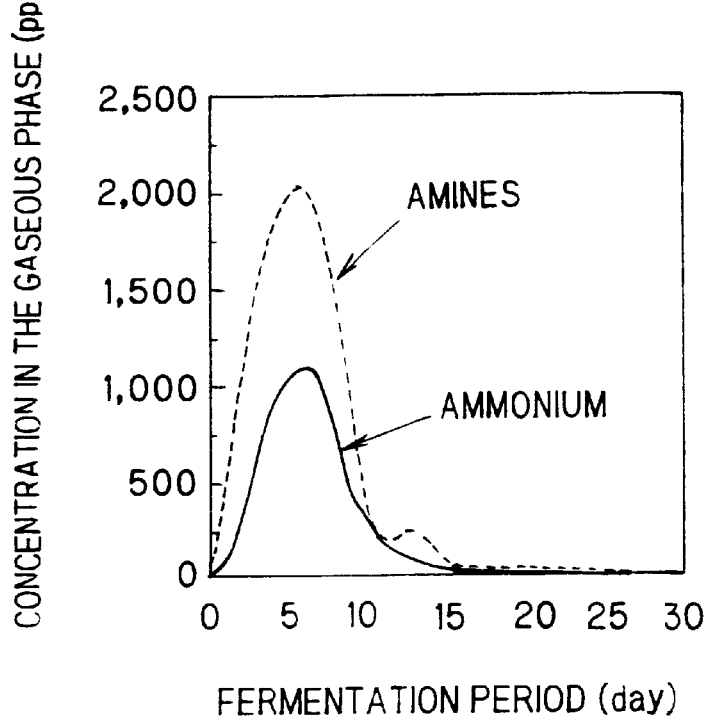
FIG. 4 illustrates concentrations of amine and ammonium in the gaseous phase discharged during fermentation of spent grains.
Figure 5:
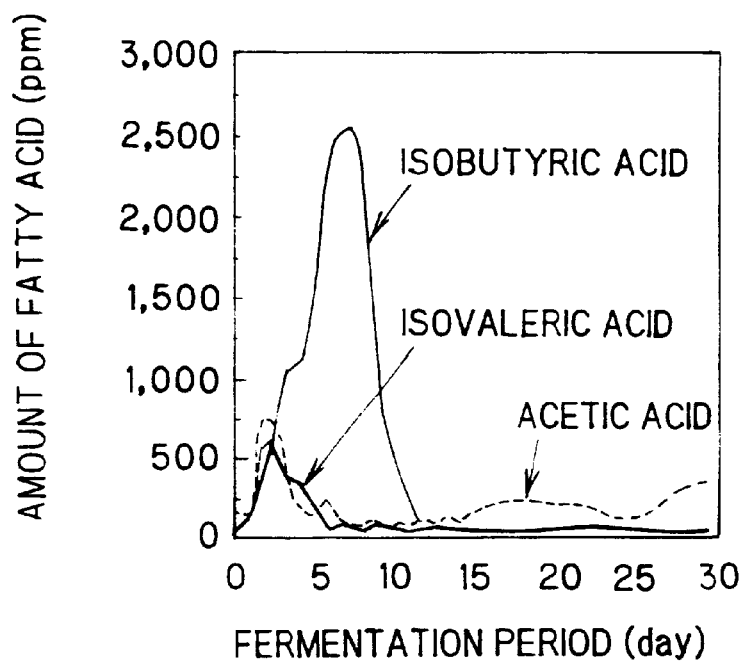
FIG. 5 illustrates concentration of lower fatty acid contained in the fermented product of the spent grains.

After the initiation of preparation, within 2 to 3 days, the spent grains contained in the fermentation vessel elevated the temperature, while the maximum temperature during fermentation reaching 70° C. or more (FIG. 3). As the fermentation proceeds, gas such as ammonia gas and amine occurred (FIG. 4), and generation of isobutyric acid, isovaleric acid, acetic acid, and the like was observed (FIG. 5).

Figure 6:
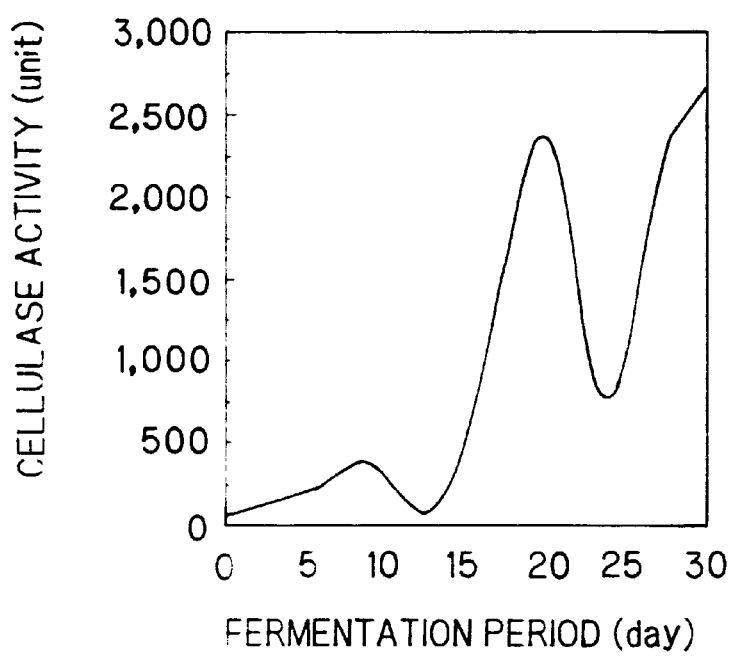
FIG. 6 illustrates concentration of cellulase activity during fermentation of the spent grains.

Thereafter, as the fermentation continued while aerating, ammonia gas, amine gas, lower fatty acid, and the like substantially disappeared within about 2 weeks (FIG. 4), the fermentation temperature became 40° C. or less (FIG. 3), and a stable state as compost was obtained Thus, after two weeks, the stirring times were reduced to once a day, while the aeration continued. Then, it appears the growth of fungi and/or actinomycetes, the cellulase activity was improved, and decomposition of refractory substances such as cellulose was facilitated (FIG. 6).

Thirty days later from the begining of fermentation, about 7 $m^3$ of compost was obtained. Most of this compost was in the form of flake, having the grain size of 5 to 10 mm.

TEST EXAMPLE 1

Two percent (w/w) of spent grains compost were added to about 15 $m^3$ (7.8 tons) of spent grains (adjusted to the moisture content of 55–70%) yielded in a beer factory and mixed. The resulting mixture was delivered to a batch fermentation vessel having the width of 2 meters, the height of 1.2 meters, and the depth of 13 meters, so that a preparation for composting was completed.

As for a fermentation management condition after the completion of preparation, aeration pipes (diameter of 5 cm) each having 2 mm in diameter of apertures spaced by 10 cm were placed on a floor of the fermentation vessel in parallel at intervals of 60 cm. The aeration into the fermentation vessel through these pipes was forced. Then, the oxygen concentration within the fermentation vessel indicated 15% or more. Further, water was kept at 60±5% using the distribution pipe, and stirring was conducted twice or more a day by a puddle stirrer so that the fermentation can be uniformly conducted.

The fermentation state was examined, the temperature change at the fermentation at the center portion of the fermentation layer and in the vicinity of the floor surface were measured, and the concentration change of amines and ammonium gas was also measured by a gaseous detection tube to determine the timing of addition of sugars in a divisional manner. The result was shown in FIGS. 7 and 8.

As a result, the fermentation temperature of the spent grains drastically increased from the second day after the beginning of preparation, 3 to 4 days later reaching about 70° C. which is the maximum temperature during fermentation, and active fermentation was apparently being conducted. At the same time, amines and ammonium gases were actively generated, and therefore, it was discovered that yield was associated with the temperature at the beginning of fermentation.

EXAMPLE 2

Figure 7:
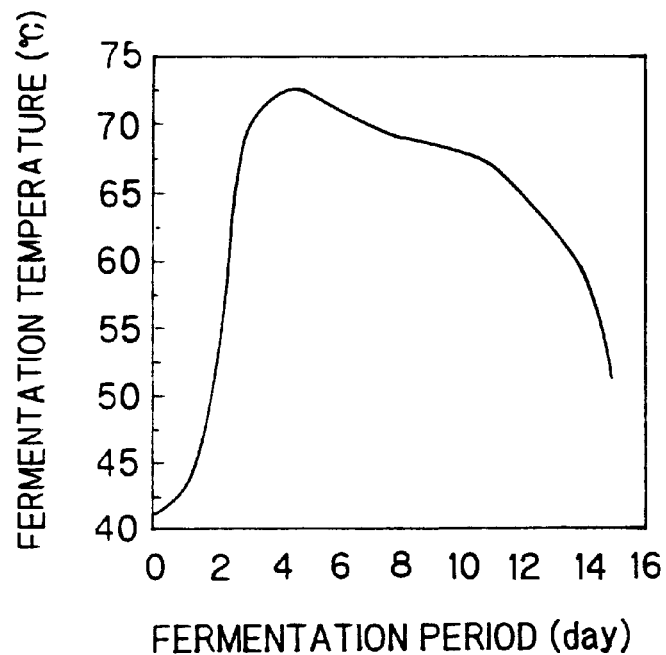
FIG. 7 illustrates the fermentation period and temperature during the fermentation in case of composting the spent grains.
Figure 8:
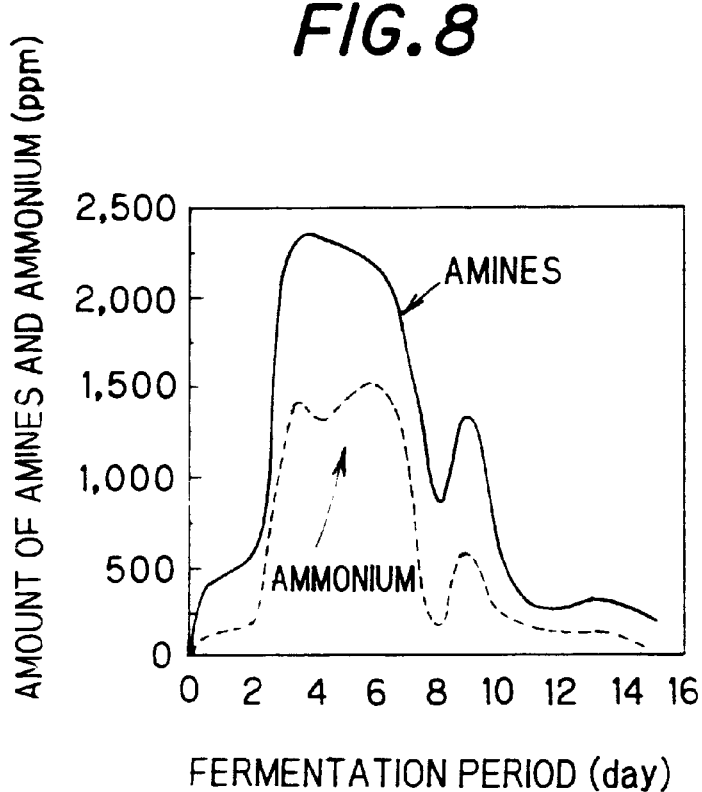
FIG. 8 illustrates a change of a concentration of amines and ammonium formed during fermentation of the spent grains.
Figure 9:
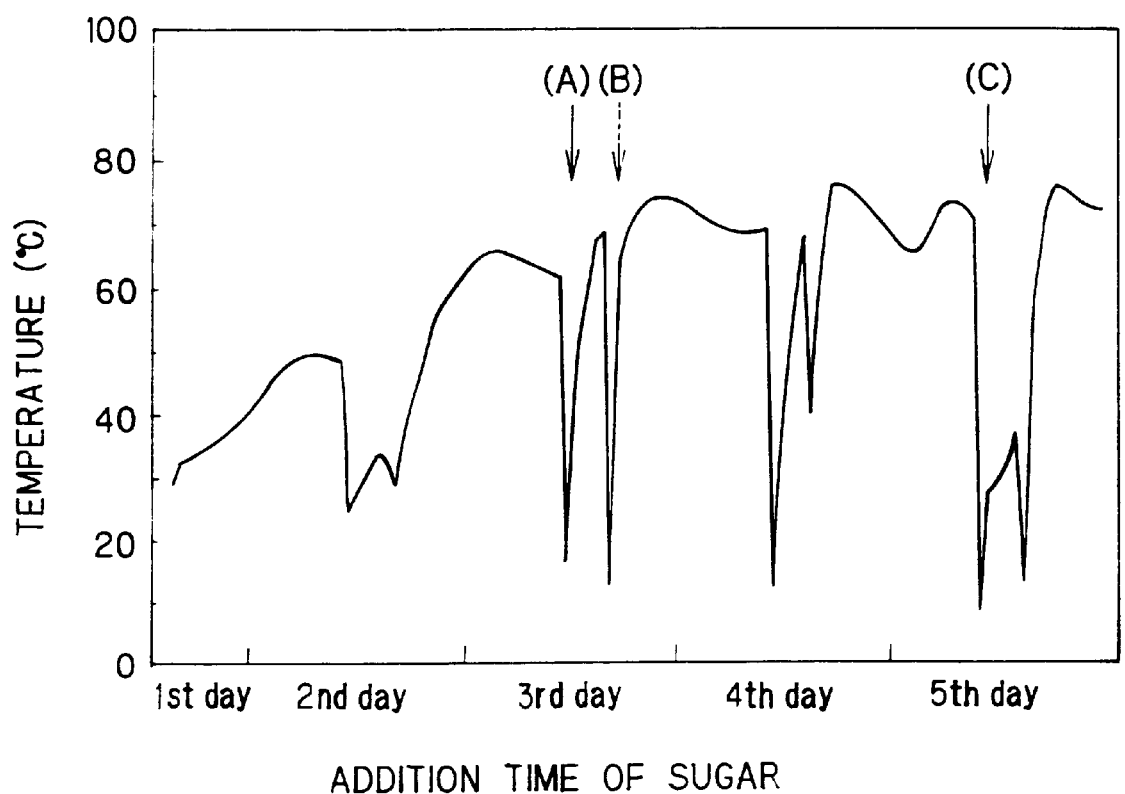
FIG. 9 illustrates a relation between addition time of sugar and the change of the fermentation temperature.

The aerobic fermentation was conducted using the same material as that of Test Example 1 in the same manner. That is, the fermentation was initiated at the stage of the primary fermentation, and as about 2 to 3 days elapsed, the temperature increased by heat caused by the fermentation to about 65±10° C. which is the maximum temperature at the fermentation (FIG. 7). At this stage, 100 kg (corresponding to about 0.1% of the whole material) of blackstrap molasses (manufactured by Naka-Nihon Hyouto K. K.) were entirely added to the material. Concurrently, water was supplied and the material was stirred. The state of the fermentation temperature at this time was shown in FIG. 9. FIG. 9 shows detailed change of the fermentation temperature in the period from the initiation of fermentation till the fifth day. That is, it shows a partial detail of the fermentation temperature graph shown in FIG. 7. In the graph shown in FIG. 9, the fermentation temperature gradually decreased from the initial third day. It is determined that the fermentation due to the sugar decomposition metabolism was in the state of being low due to decrease of the sugar content serving as an energy source. Then, at the point indicated by an arrow A. 100 kg of blackstrap molasses were added to the material, whereby it can be clearly observed from FIG. 9 that the fermentation was activated again.

Incidentally, the fermentation temperature went down drastically at the A point, which resulted from the fact that water was supplied and the material was stirred at the same time of addition of blackstrap molasses, as previously described Further, the fact that the outside air temperature was below 10° C. when the experiment was made was one of the factors.

The drastic change of the fermentation temperature at the B point after the lapse of 6 to 8 hours from the A point was caused by stirring of the material (stirred twice a day). Further, subsequent point of adding blackstrap molasses was implemented at the point C on the fifth day after the initiation of fermentation. In a similar manner at the point A, 100 kg of blackstrap molasses was added, and at the same time, water was supplied and the material was stirred. From this time, 100 kg of blackstrap molasses was added every 2 to 3 days (divisional addition portion) until the primary fermentation period terminated (for about 2 weeks). After the primary fermentation conducted for about 2 weeks was completed, the secondary fermentation for about 2 weeks was conducted, and the fermentation was completed through the whole process of fermentation for about 30 days.

Figure 10:
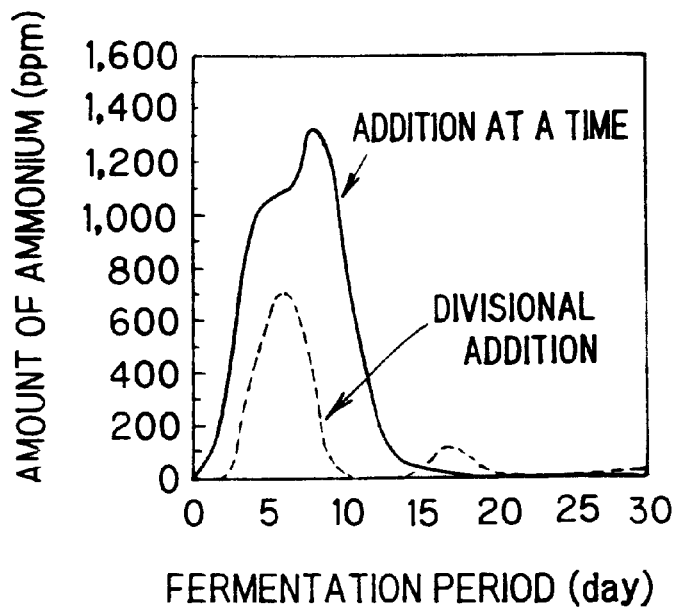
FIG. 10 illustrates ammonium formed during fermentation at the portions where saccharides are added in a divisional manner and a batch manner (addition at a time).
Figure 11:
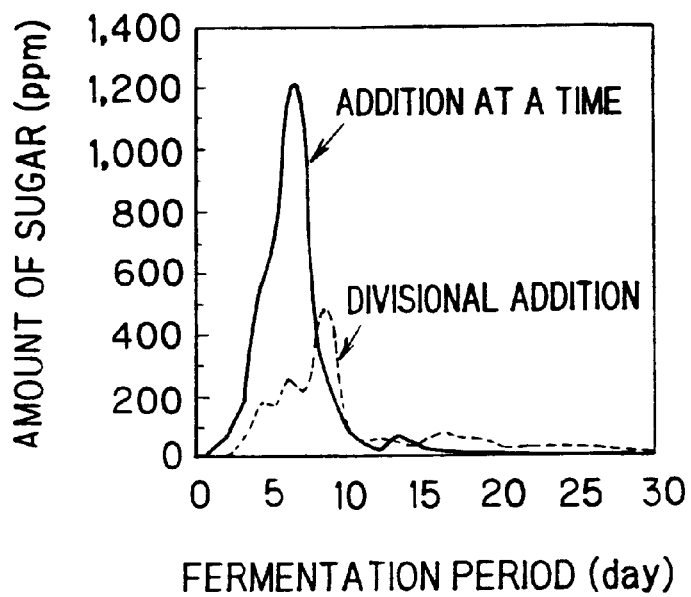
FIG. 11 illustrates the amount of the lower fatty acid contained in the fermented products at the portions where sugars are added in a divisional manner and a batch manner.

The concentrations of ammonia gas and lower fatty acid were measured in the fermentation period. The results are shown in FIGS. 10 and 11. For the purpose of comparison, an experiment was made with respect to the batch addition portion in which the blackstrap molasses were added in a batch manner at the beginning of fermentation, the result of measurement of which is shown together therewith. Further, some index for compost components as a basis for using it as compost was measured in a conventional means. Incidentally, the non-addition group as a control in which no blackstrap molasses were added was also measured The result of measurement for the respective components are shown in Table 1.

TABLE 1

| | Non-Addition Portion | Batch Addition Portion | Divisional Addition Portion |
|---|---|---|---|
| (% in anhydride) | | | |
| Ash Content | 10.13 | 10.16 | 9.63 |
| Organic Material | 89.87 | 89.84 | 90.37 |
| Whole Nitrogen | 5.06 | 5.33 | 5.16 |
| Ammonium Nitrogen | 0.68 | 0.53 | 0.52 |
| Potassium ($K_2O$) | 0.15 | 0.45 | 0.54 |
| Phosphorus ($P_2O_5$) | 3.44 | 3.27 | 2.44 |
| Moisture Content (%) | 47.60 | 45.00 | 38.40 |
| pH | 7.27 | 7.21 | 6.93 |

TABLE 1-continued

|  | Non-Addition Portion | Batch Addition Portion | Divisional Addition Portion |
|---|---|---|---|
| Electrical Conductivity (mS/cm) | 1890 | 2450 | 2420 |
| Chromaticity (L) | 20.45 | 20.32 | 21.33 |
| Chromaticity (a) | 3.76 | 3.87 | 3.50 |
| Chromaticity (b) | 6.26 | 6.04 | 5.74 |

As is apparent from the figures, it is observed that amount of ammonia gas was inhibited by about 50% in the divisional addition portion, comparing that of the batch addition portion. Further, amount of lower fatty acid which has an ability of inhibiting the growth of plants was also inhibited to half or less of that of the batch addition portion.

On the other hand, comparing the compost components, no remarkable difference was observed in the most indices in the 3 test portions, and therefore no influence to the compost components due to addition of the blackstrap molasses was observed.

INDUSTRIAL APPLICABILITY

According to the present invention, organic waste materials disposed from food processing factories and the like can be effectively utilized as the material for producing compost. Further, since the fermentation is designed to be always conducted under the aerobic condition, unpleasant odors can be prevented from occurring in the fermentation period, and the fermentation can be effectively completed within a short period of time. Still further, a process and an apparatus is provided for effectively inhibiting occurrence and accumulation of lower fatty acid serving as a factor for growth inhibition of plants, and for effectively producing compost of high quality.

What is claimed is:

1. An apparatus for producing compost, comprising a fermentation vessel having a floor, an oxygen distributing means mounted on the surface of said floor, a stirring means equipped with a stirring blade, said stirring means capable of moving reciprocally in a longitudinal direction of the fermentation vessel, and with a water distributing means being installed to the stirring means; and a control means for automatically detecting or determining a moisture content and oxygen concentration of spent grains contained in the fermentation vessel to control, on the basis of the detected or determined result, the distribution amount distributed by the water and oxygen distributing means.

2. The apparatus as claimed in claim 1, wherein said oxygen distributing means is an aeration pipe.

3. The apparatus as claimed in claim 1, wherein said stirring means is a paddle wheel.

4. The apparatus as claimed in claim 1, wherein said water distribution means is a pipe.

5. The apparatus as claimed in claim 1, wherein said oxygen distributing means is an aeration pipe, said stirring means is a paddle wheel, and said water distributing means is a pipe.

\* \* \* \* \*